US008244005B2

(12) United States Patent
Tabe (10) Patent No.: US 8,244,005 B2
(45) Date of Patent: Aug. 14, 2012

(54) ELECTRONIC APPARATUS AND IMAGE DISPLAY METHOD

(75) Inventor: Kenichi Tabe, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/905,015

(22) Filed: Oct. 14, 2010

(65) Prior Publication Data

US 2011/0110564 A1 May 12, 2011

(30) Foreign Application Priority Data

Nov. 6, 2009 (JP) ................................. 2009-255313

(51) Int. Cl.
*G06K 9/00* (2006.01)

(52) U.S. Cl. ......... 382/118; 382/115; 382/282; 382/294

(58) Field of Classification Search .......... 382/115–118, 382/282, 294
See application file for complete search history.

(56) References Cited

U.S. PATENT DOCUMENTS

| 6,118,888 | A  | * | 9/2000  | Chino et al.      | 382/118  |
|-----------|----|---|---------|-------------------|----------|
| 6,144,755 | A  | * | 11/2000 | Niyogi et al.     | 382/118  |
| 6,931,147 | B2 | * | 8/2005  | Colmenarez et al. | 382/118  |
| 7,190,475 | B2 | * | 3/2007  | Nomoto            | 358/1.15 |
| 7,643,658 | B2 | * | 1/2010  | Kilner et al.     | 382/118  |
| 7,773,832 | B2 |   | 8/2010  | Nakajima          |          |
| 7,876,931 | B2 | * | 1/2011  | Geng              | 382/118  |
| 2002/0176610 | A1 | * | 11/2002 | Okazaki et al. | 382/118  |
| 2005/0111737 | A1 | * | 5/2005  | Das et al.     | 382/190  |
| 2005/0281482 | A1 | * | 12/2005 | Nishiyama      | 382/282  |
| 2006/0018522 | A1 | * | 1/2006  | Sunzeri et al. | 382/118  |
| 2006/0203012 | A1 |   | 9/2006  | Nakajima       |          |
| 2009/0034806 | A1 | * | 2/2009  | Hayase         | 382/118  |
| 2009/0089713 | A1 | * | 4/2009  | Tabe           | 715/838  |
| 2009/0178126 | A1 | * | 7/2009  | Du et al.      | 726/6    |
| 2010/0083128 | A1 | * | 4/2010  | Kon et al.     | 715/741  |

FOREIGN PATENT DOCUMENTS

| JP | 2005-033276 |   | 2/2005  |
|----|-------------|---|---------|
| JP | 2005033276  | * | 2/2005  |
| JP | 2006-285964 |   | 10/2006 |
| JP | 2006285964  | * | 10/2006 |
| JP | 2008-131081 |   | 6/2008  |
| JP | 2008-141484 |   | 6/2008  |

(Continued)

OTHER PUBLICATIONS

Notice of Reasons for Rejection mailed by the Japan Patent Office on Feb. 22, 2011 in the corresponding Japanese patent application No. 2009-255313 in 9 pages.

*Primary Examiner* — Jayesh A Patel
(74) *Attorney, Agent, or Firm* — Knobbe, Martens Olson & Bear (57) ABSTRACT

According to one embodiment, an electronic apparatus includes a viewer image generating module, a viewer recognition module, a group extraction module, and an image display module. The viewer image generating module generates an image of a viewer by capturing the image of the viewer. The viewer recognition module detects a face image in the generated image and recognizes the viewer corresponding to the detected face image. The group extraction module extracts, from a plurality of groups each including still images, groups including at least one of a still image including the face image of the viewer and a still image imported by the viewer. The image display module displays still images in the extracted groups on a screen.

4 Claims, 7 Drawing Sheets

FOREIGN PATENT DOCUMENTS

| | | | |
|---|---|---|---|
| JP | 2008-165009 | | 7/2008 |
| JP | 2008165009 | * | 7/2008 |
| JP | 2009-033351 | | 2/2009 |
| JP | 2009033351 | * | 2/2009 |
| JP | 2009-141678 | | 6/2009 |
| JP | 2009-171176 | | 7/2009 |
| JP | 2009171176 | * | 7/2009 |
| JP | 2010-067104 | | 3/2010 |
| JP | 2010067104 | * | 3/2010 |
| JP | 2011-061341 | | 3/2011 |
| JP | 2011061341 | * | 3/2011 |

* cited by examiner

ELECTRONIC APPARATUS AND IMAGE DISPLAY METHOD

CROSS-REFERENCE TO RELATED APPLICATIONS

This application is based upon and claims the benefit of priority from Japanese Patent Application No. 2009-255313, filed Nov. 6, 2009; the entire contents of which are incorporated herein by reference.

FIELD

Embodiments described herein relate generally to an electronic apparatus which displays an image, and an image display method applied to the electronic apparatus.

BACKGROUND

In recent years, video reproduction apparatuses, which are called digital photo frames, have been gaining in popularity. The digital photo frame has, for example, a function of successively displaying, at regular intervals, still images in a storage medium connected to the digital photo frame. In general, personal computers, digital cameras, etc., as well as the digital photo frames, have the function of successively displaying still images at regular intervals.

Jpn. Pat. Appln. KOKAI Publication No. 2009-171176 discloses a reproduction apparatus which recognizes a face image of a person captured by a camera, and displays favorite image files or audio files which are registered in association with the face image if the recognized face image is a registered face image. In this reproduction apparatus, the user's face image and image files and audio files selected by the user are registered in advance.

In the reproduction apparatus of KOKAI Publication No. 2009-171176, pre-registered image files or audio files are reproduced in accordance with the recognized user's face image. Thus, if the files stored in the reproduction apparatus have been updated or if the files to be reproduced are to be changed, the user is required to change once again the files that are registered as favorites. In addition, if the number of files stored in the reproduction apparatus is very large, it may be time-consuming for the user to select, from the many files, some files which are to be registered.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus comprises a viewer image generating module, a viewer recognition module, a group extraction module, and an image display module. The viewer image generating module generates an image of a viewer by capturing the image of the viewer. The viewer recognition module detects a face image in the generated image and recognizes the viewer corresponding to the detected face image. The group extraction module extracts, from a plurality of groups each comprising still images, groups comprising at least one of a still image comprising the face image of the viewer and a still image imported by the viewer. The image display module displays still images in the extracted groups on a screen.

Figure 1:
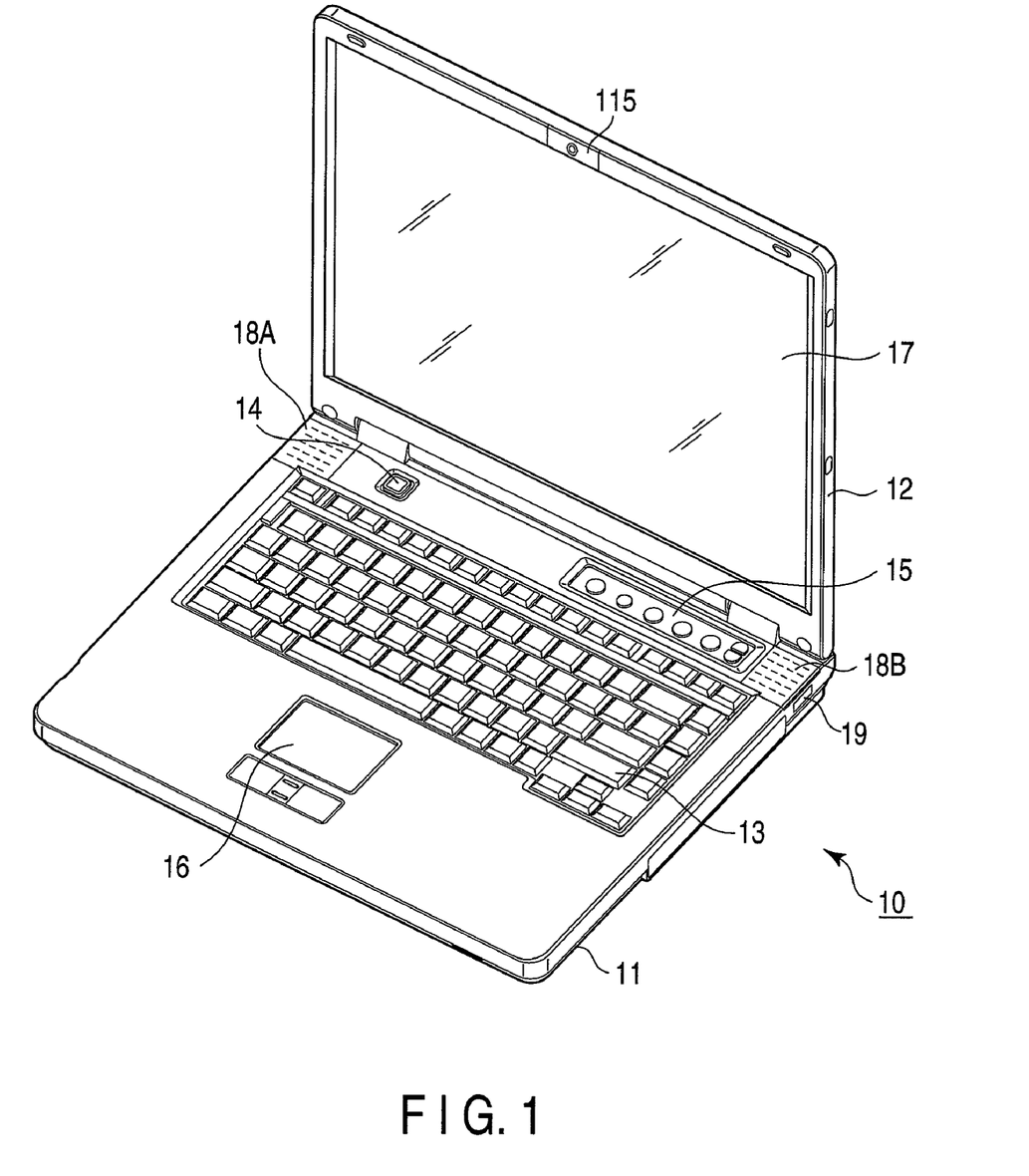
FIG. 1 shows an exemplary external appearance of an electronic apparatus according to an embodiment.

FIG. 1 is a view showing an external appearance of an electronic apparatus according to an embodiment. The electronic apparatus is realized, for example, as a notebook-type personal computer 10.

As shown in FIG. 1, the computer 10 comprises a computer main body 11 and a display unit 12. A display device comprising a liquid crystal display (LCD) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered. The display unit 12 further comprises a camera module 115 at an upper part of the LCD 17. The camera module 115 is used in order to capture, for instance, an image of the user of the computer 10, when the display unit 12 is in the open position.

The computer main body 11 has a thin box-shaped housing. A keyboard 13, a power button 14 for powering on/off the computer 10, an input operation panel 15, a touch pad 16, and speakers 18A and 18B are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the universal serial bus (USB) 2.0 standard. Further, the rear surface of the computer main body 11 is provided with an external display connection terminal (not shown) which supports, e.g. the high-definition multimedia interface (HDMI) standard. This external display connection terminal is used in order to output a digital video signal to an external display.

Figure 2:
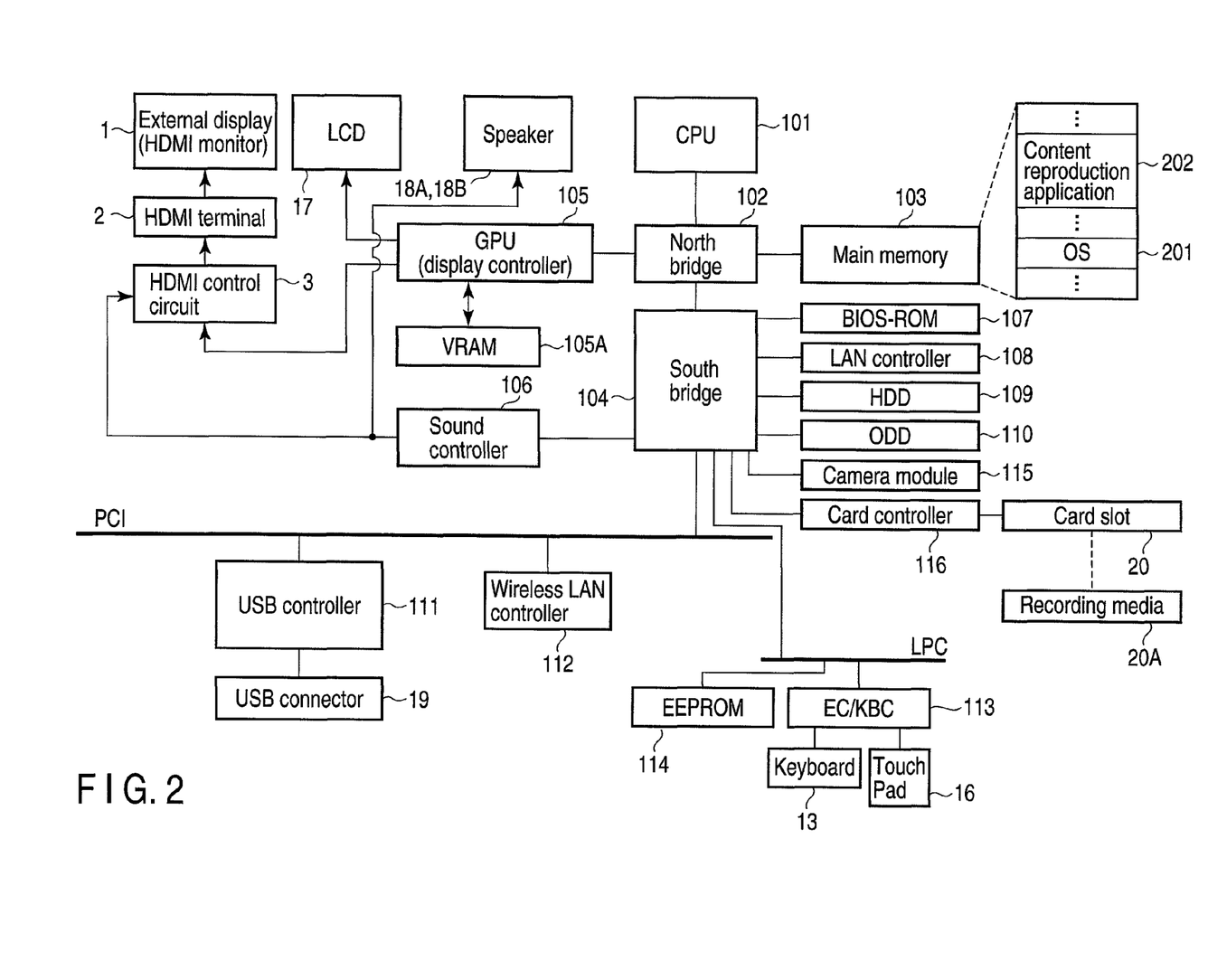
FIG. 2 shows an exemplary system configuration of the electronic apparatus according to the embodiment.

FIG. 2 shows the system configuration of the computer 10.

The computer 10, as shown in FIG. 2, comprises a central processing unit (CPU) 101, a north bridge 102, a main memory 103, a south bridge 104, a graphics processing unit (GPU) 105, a video random access memory (VRAM) 105A, a sound controller 106, a basic input/output system-read only memory (BIOS-ROM) 107, a local area network (LAN) controller 108, a hard disk drive (HDD) 109, an optical disc drive (ODD) 110, a USB controller 111, a wireless LAN controller 112, an embedded controller/keyboard controller (EC/KBC)

113, an electrically erasable programmable ROM (EEPROM) 114, a camera module 115, and a card controller 116.

The CPU 101 is a processor for controlling the operation of various components in the computer 10. The CPU 101 executes an operating system (OS) 201 and various application programs, such as a content reproduction application program 202, which are loaded from the HDD 109 into the main memory 103. The content reproduction application program 202 is software for reproducing various digital contents, such as digital photos and home video, which are stored in, e.g. a digital versatile disc (DVD) that is set in, e.g. the ODD 110. The content reproduction application program 202 also has a function of displaying a digital image, which is stored in the HDD 109, like a so-called digital photo frame. The CPU 101 also executes a BIOS stored in the BIOS-ROM 107. The BIOS is a program for hardware control.

The north bridge 102 is a bridge device which connects a local bus of the CPU 101 and the south bridge 104. The north bridge 102 comprises a memory controller which access-controls the main memory 103. The north bridge 102 also has a function of executing communication with the GPU 105 via, e.g. a PCI EXPRESS serial bus.

The GPU 105 is a display controller which controls the LCD 17 used as a display monitor of the computer 10. A display signal, which is generated by the GPU 105, is sent to the LCD 17. In addition, the GPU 105 can send a digital video signal to an external display device 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display device 1, such as a TV, via a single cable. The HDMI control circuit 3 is an interface for sending a digital video signal to the external display device 1, which is called "HDMI monitor", via the HDMI terminal 2.

The south bridge 104 controls devices on a peripheral component interconnect (PCI) bus and devices on a low pin count (LPC) bus. The south bridge 104 comprises an integrated drive electronics (IDE) controller for controlling the HDD 109 and ODD 110. The south bridge 104 also has a function of executing communication with the sound controller 106.

The sound controller 106 is a sound source device and outputs audio data, which is to be reproduced, to the speakers 18A and 18B or the HDMI control circuit 3.

The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 113 executes communication with an external device which supports, e.g. the USB 2.0 standard (the external device is connected via the USB connector 19). For example, the USB controller 113 executes communication when taking in digital images, which are managed by a digital camera that is an external device, and to store the digital images in the HDD 109.

The camera module 115 executes a capturing (imaging) process using a built-in camera. The camera module 115 generates image data by using, e.g. an image captured by the built-in camera and executes, e.g. communication for storing the image data in the main memory 103 or HDD 109. In addition, the camera module 115 supplies the image data to various application programs such as the content reproduction application program 202.

The card controller 116 executes communication with a recording medium 20A inserted in a card slot 20. For example, the card controller 116 executes, e.g. communication for reading an image file in an SD card (the recording medium 20A), and storing the read image file in the HDD 109.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Figure 3:
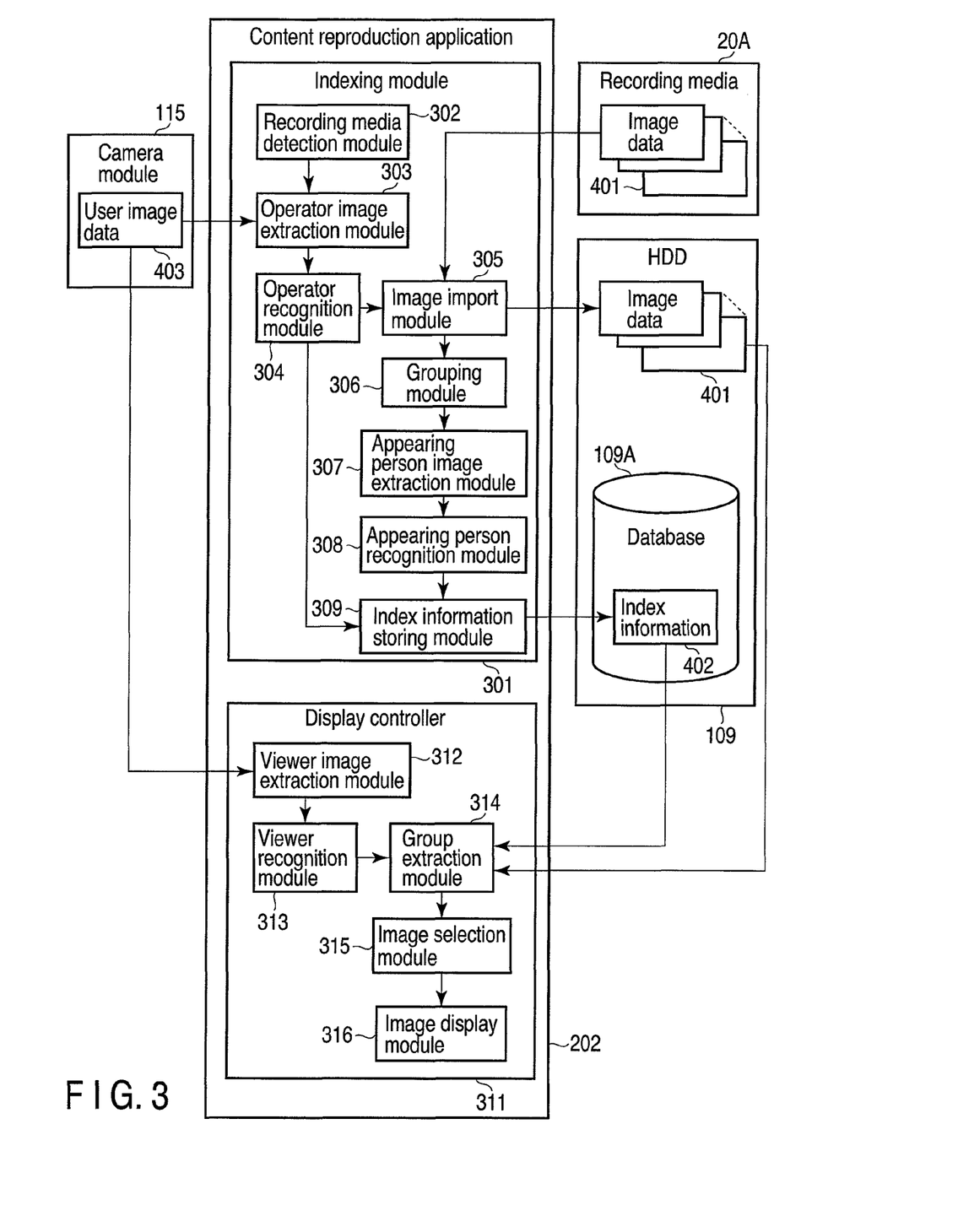
FIG. 3 is an exemplary block diagram showing the functional structure of a content reproduction application program which runs on the electronic apparatus according to the embodiment.

Next, referring to FIG. 3, a description of a functional structure of the content reproduction application 202 which runs on the computer 10 is given. Of the functions of the content reproduction application 202, a description is given of an example of the structure for realizing the function of displaying a digital image (still image data) 401 stored in the HDD 109 like a so-called digital photo frame. The content reproduction application program 202 comprises an indexing module 301 and a display controller 311. The content reproduction application program 202 has an import mode for importing still images and a presentation mode for selectively presenting still images which are imported.

The indexing module 301 is used in the import mode. Specifically, the indexing module 301 executes various processes relating to indexing for importing the still images 401 and creating index information 402 for searching for a target still image from among the still images 401. The "import" of the still images 401 means taking the still images (still image data) 401 in the computer 10, to be more specific, taking the still images 401 in the content reproduction application program 202. In addition, the still images 401 may be images of frames constituting moving picture data.

The indexing module 301 comprises a recording media detector 302, an operator image extraction module 303, an operator recognition module 304, an image import module 305, a grouping module 306, an appearing person image extraction module 307, an appearing person recognition module 308, and an index information storing module 309. The recording media detector 302 detects that the recording medium 20A, which is the source of import of the still images 401, has been connected. For example, the recording media detector 302 detects that the recording medium 20A has been inserted in the card slot 20. The source of import of the still images 401 is not limited to the recording medium 20A, and may be a storage device in the computer 10, an external storage device connected to the computer 10, or some other computer connected to the computer 10 via a network. In this case, the recording media detector 302 detects that the storage device, or the like, has been connected (recognized), that files (new still image data) have been stored in a designated directory, or the like, or that an instruction has been issued by the user. The recording media detector 302 notifies the operator image extraction module 303 that the recording medium 20A, or the like, has been detected.

The operator image extraction module 303 analyzes user image (user image data) 403 generated by the camera module 115, and extracts a face image of the operator of the computer 10. For example, the operator image extraction module 303 detects a face region from the user image 403, and extracts the detected face region from the user image 403. The detection of the face region can be executed, for example, by analyzing the features of the user image data 403, and searching for a region having features similar to face image feature samples prepared in advance. The face image feature samples are feature data calculated by statistically processing face image features of many persons. The operator image extraction module 303 outputs the extracted face image to the operator recognition module 304.

The operator recognition module 304 analyzes the face image extracted by the operator image recognition module 303, and recognizes the person corresponding to the face image as the operator. The operator recognition module 304 notifies the image import module 305 of the completion of recognition of the operator. The operator recognition module 304 outputs the information of the recognized operator to the index information storing module 309. If the face image of the operator cannot be detected or if the face image of the operator cannot be recognized, it may be possible to newly capture a user image 403 using the camera module 115 and to execute extraction and recognition of the operator's face image once again.

Responding to the information from the operator recognition module 304, the image import module 305 starts import of the still images 401 stored in the recording medium 20A. The image import module 305 imports the still images 401 into the content reproduction application program 202. The image import module 305 reads the still images 401 from the recording medium 20A and stores the read still images 401 in the HDD 109.

The grouping module 306 classifies the still images 401 based on a predetermined classification rule, and creates groups. The grouping module 306 classifies the still images 401, for example, based on the time, location, event, etc. For example, if there are two still images 401 which are successive on a time-series axis and the time interval difference between the date/time of capturing one of these two still images 401 and the date/time of capturing the other of the two still images 401 is greater than a predetermined time period, the grouping module 306 performs grouping by using the boundary between the two still images 401 as a break-point. In addition, if the still images 401 are images of frames constituting moving picture data, the grouping module 306 detects a so-called scene change point, before and after which the features of images greatly change, and performs grouping by setting each of scenes to be one section. A logic-unit group created by classification is also called an event group.

The appearing person image extraction module 307 analyzes the still image 401, and extracts a face region in the still image 401. For example, the appearing person image extraction module 307 detects the face region from the still image 401, and extracts the detected face region from the still image data 401. The appearing person image extraction module 307 outputs the extracted face image to the appearing person recognition module 308.

The appearing person recognition module 308 analyzes the face image extracted by the appearing person image extraction module 307, and recognizes a person corresponding to the face image as the appearing person. In addition, the appearing person recognition module 308 generates classification information for classifying face images into those face images which are assumed to be associated with the same person. The appearing person recognition module 308 outputs the information of the recognized appearing person to the index information storing module 309.

The index information storing module 309 stores in a database 109A, as index information 402, the data which associates the still images 401 with the information of the operator recognized by the operator recognition module 304, and the information of the appearing person recognized by the appearing person recognition module 308. In some cases, it is assumed that the above-mentioned operator is the owner of the still images 401 that are imported (e.g. the photographer of photos). Thus, not only the appearing person in the still images 401, but also the owner of the still images 401 can be associated with the still images 401 and registered.

In addition, the index information storing module 309 also registers the information of the groups classified by the grouping module 306 by associating this information with the still images 401. Thus, the information of the operator and the appearing person, which is associated with each of the still images, is also used as the information of the person associated with the group (event group) comprising the still images.

Figure 4:
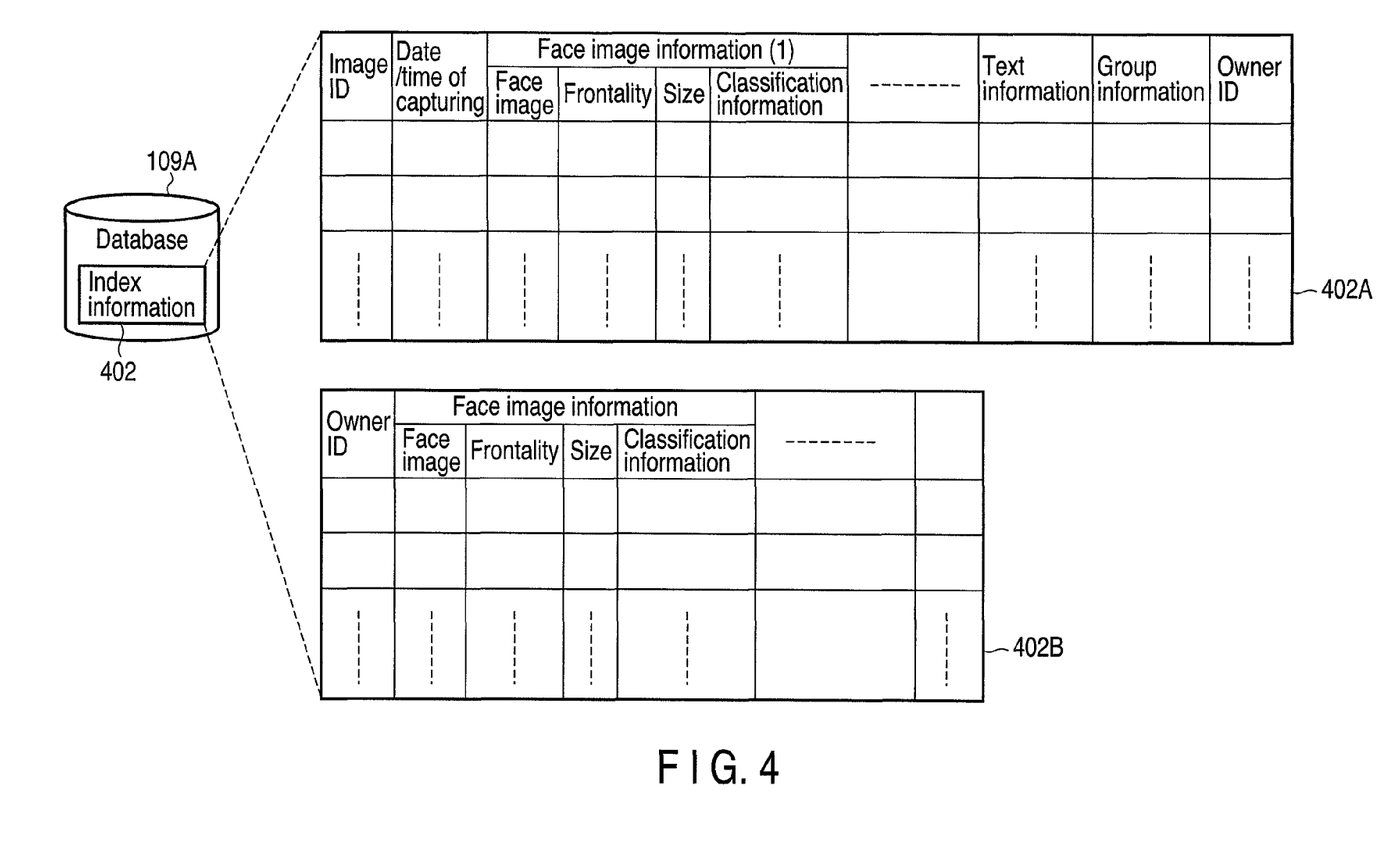
FIG. 4 shows an example of the structure of index information used by the content reproduction application program of FIG. 3.

The database 109A is a storage area prepared in the HDD 109 for storing the index information 402. FIG. 4 shows a structure example of the index information 402 in the database 109A. The index information 402 comprises image information 402A and photographer information 402B. The image information 402A is stored in association with each of images imported by the image import module 305. The photographer information 402B is information of the photographer of images (import operator).

The image information 402A comprises an image ID, date/time of capturing, face image information, text information, group information, and a photographer ID, in association with each of images. The image ID is indicative of identification information which is uniquely allocated to each of still images (still image data) 401. The date/time of capturing is indicative of time information indicating the date/time of capturing of each still image 401. If a still image is one of frames constituting moving picture data, a value (time stamp information), which is calculated by adding an elapsed time from the first frame, which is based on the frame number, to the date/time of capturing of the moving picture data, is set as the date/time of capturing of this still image. In the meantime, the date/time of capturing may be a date/time of storage or a date/time of update of the still image 401.

The face image information is indicative of information of the face image in each still image 401. If each still image 401 comprises face images, the same numbers of face image information items, as the number of the face images, are stored. The face image information comprises a face image, frontality, size, and classification information. The face image is indicative of the face image recognized by the appearing person recognition module 308. The frontality is indicative of the degree of frontality of the face image which is captured in the frontal direction. The size is indicative of the size of the face image (e.g. pixel-unit image size). The classification information is indicative of a result of classification of face images, which are recognized by the appearing person recognition module 308 and classified into face images which are assumed to be associated with the same person. Accordingly, the classification information is indicative of identification information (personal ID) which is uniquely allocated to a person.

The text information is indicative of information of characters in each still image 401. The indexing module 301 may be provided with a character recognition function for detecting character region (e.g. characters on an advertizing display) in each still image 401 and recognizing the detected character region. The characters, which have been recognized by using the character recognition function, are stored as the text information. The detection (recognition) of characters are executed, for example, by searching for a region having a feature amount similar to a feature amount of each character which is prepared in advance.

The group information is indicative of information (group ID) for identifying groups created by the grouping module 306. Thus, the information indicative of the group, to which the associated still image belongs, is stored as the group information.

The photographer ID is indicative of identification information which is uniquely allocated to the person recognized by the operator recognition module 304. Specifically, the identification information, which is allocated to the operator who has executed the operation of importing the still images 401, is stored as the photographer ID. Thus, to each of still images imported by the same person, the same photographer ID corresponding to this person is set. The information of the photographer corresponding to this photographer ID is stored as the photographer information 402B.

The photographer information 402B is indicative of the information of the operator (photographer) who executes the operation of importing the still image data 401. The photographer information 402B comprises a photographer ID, and face image information.

The photographer ID, as described above, is indicative of the identification information which is allocated to the operator who has executed the operation of importing the still image data 401. The photographer ID in the image information 402A corresponds to the photographer ID in the photographer information 402B.

The face image information is indicative of information relating to the face image recognized by the operator recognition module 304, that is, the face image of the operator (photographer). The face image information comprises a face image, frontality, size, and classification information. The face image is indicative of the face image recognized by the operator recognition module 304. The frontality is indicative of the degree of frontality of the face image which is captured in the frontal direction. The size is indicative of the size of the face image (e.g. pixel-unit image size). The classification information is indicative of a result of classification of face images, which are recognized by the operator recognition module 304 and classified into face images which are assumed to be associated with the same person. Accordingly, the classification information is indicative of identification information (personal ID) which is uniquely allocated to a person.

Specifically, according to the index information 402, it can be understood, with respect to each still image 401, who appears in the image, whether text is composed in the image, to which group the image belongs, and who has captured the image. In other words, using the index information 402, it is possible to quickly search for, from among the still images 401 stored in the HDD 109, still images 401 in which a target person appears, still images 401 in which the target person does not appear, still images 401 in which the target person appears and text appears, and still images 401 captured by the target person.

The display controller 311 is used in the presentation mode. Specifically, using the index information 402, the display controller 311 selects, from the still images 401 in the HDD 109, still images which meet a predetermined selection condition, and successively displays the selected still images. The display controller 311 may not only perform simple successive display of selected still images, but also may display the selected still images by applying thereto a transition effect at a time of a change of display.

The display controller 311 comprises a viewer image extraction module 312, a viewer recognition module 313, a group extraction module 314, an image selection module 315, and an image display module 316. The viewer image extraction module 312 analyzes, for example, the user image 403 generated by the camera module 115 during the period of the presentation mode, and extracts the face image of the viewer in the user image 403. The viewer image extraction module 312 detects, for example, a face region from the user image 403, and extracts the detected face region from the user image 403. The viewer image extraction module 312 outputs the extracted face image to the viewer recognition module 313.

The viewer recognition module 313 analyzes the face image extracted by the viewer image extraction module 312, and recognizes the person, who corresponds to this face image, as the viewer. The viewer recognition module 313 outputs the information of the recognized viewer to the group extraction module 314. If the face image of the viewer cannot be detected or if the face image of the viewer cannot be recognized, it may be possible to newly capture user image 403 by using the camera module 115 and to execute extraction and recognition of the viewer's face image once again. In addition, if the viewer cannot be recognized even if recognition of the viewer (extraction of the face image of the viewer) is executed a predetermined number of times, it may be determined that there is no viewer of the screen (LCD 17), and the content reproduction application 202 may be transitioned to a power-saving mode in which the operation with reduced power is enabled. For example, the content reproduction application 202, which operates in the power-saving mode, powers off the LCD 17.

If the viewer has been recognized, the viewer recognition module 313 outputs the information of the recognized viewer to the group extraction module 314. In the meantime, face images may be extracted from the user image data 403 by the viewer image extraction module 312. In other words, viewers may be recognized by the viewer recognition module 313. In this case, the viewer recognition module 313 outputs the information of each of the recognized viewers to the group extraction module 314.

Based on the information of the viewer who has been recognized by the viewer recognition module 313, the group extraction module 314 extracts groups (event groups) comprising the associated still image from the event groups in the HDD 109. Specifically, the group extraction module 314 extracts, from the event groups, event groups comprising at least one of a still image comprising the face image of the viewer and a still image imported by the viewer, as the event groups relating to the present viewer. With each of the event groups, the face image of the appearing person in at least one of still images in the group, and the face image of the operator who imported at least one of the still images in the group may be associated. In this case, the group extraction module 314 may extract the groups with which the appearing person's face image or the operator's face image that corresponds to the viewer's face image is associated.

If there are a plurality of viewers, the group extraction module 314 extracts, from groups, groups in which the face images of all viewers are associated with the appearing person's face image or the photographer's face image (the face image of the operator who has executed the import operation), as the groups associated with those viewers. The group extraction module 314 outputs the information of the extracted groups to the image selection module 315.

Figure 5:
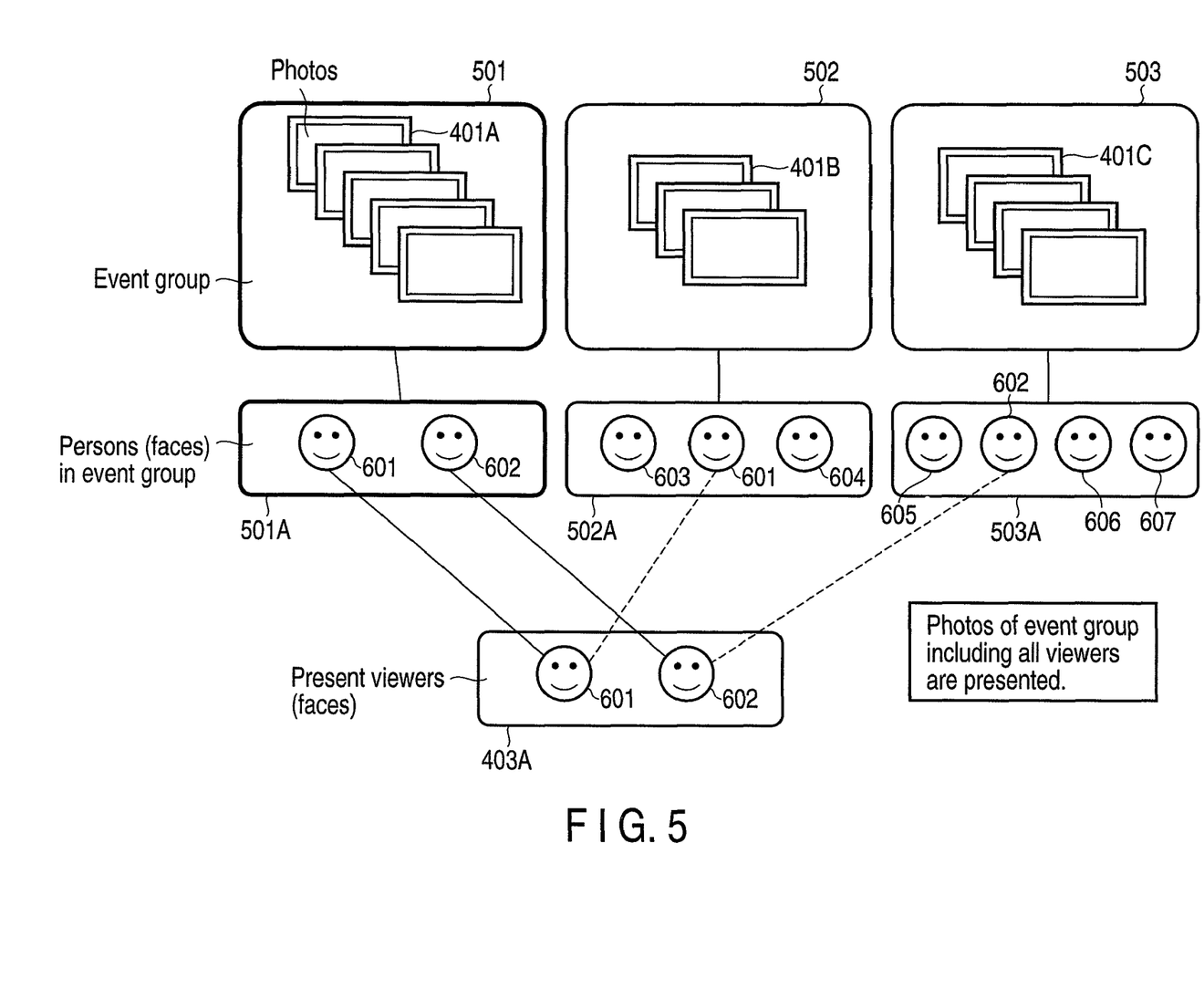
FIG. 5 is an exemplary conceptual view for explaining an example of the operation of group extraction which is executed by the content reproduction application program of FIG. 3.

Referring to FIG. 5, an example of the groups extracted by the group extraction module 314 is described. In the example shown in FIG. 5, the case is assumed in which the still images 401 are grouped into three still images 401A, 401B and 401C by the grouping module 306. The still images 401A, 401B and 401C belong to event groups 501, 502 and 503. Persons 501A, who are associated with the event group 501, comprise an appearing person 601 corresponding to a face image in the still images 401A, and a photographer 602 of the still images 401A. This means that the event group 501 comprises at least one still image 401A, which comprises the face image of the appearing person 601, and that all still images 401A in the event group 501 have been imported by the photographer 602. In the meantime, it is possibly assumed that each of the appearing person 601 and photographer 602 is the appearing person and is the photographer. In this case, for example, it is understood that the event group 501 comprises at least one still image 401A comprising the face image of the appearing person 601 and at least one still image 401A comprising the face image of the photographer (appearing person) 602, and that some still images 401A in the event group 501 are imported by the photographer 602, and some other still images 401A are imported by the appearing person (photographer) 601. Persons 502A, who are associated with the event group 502, comprise appearing person 601 and 603 corresponding to face images in the still images 401B, and a photographer 604 of the still images 401B. This means that the event group 502 comprises at least one still image 401B, which comprises the face image of the appearing person 601, and at least one still image 401B, which comprises the face image of the appearing person 603 (one still image 401B comprising both the appearing persons 601 and 603 may be comprised in the event group 502), and that all still image data 401B in the event group 502 are still images which have been imported by the photographer 604. Like the case of the event group 501, it is possibly assumed that each of the appearing persons 601, 603 and photographer 604 is the appearing person and is the photographer. Besides, persons 503A, who are associated with the event group 503, comprise appearing person 605 and 606 corresponding to face images in the still images 401C, and photographers 602, 606 of the still images 401A. This means that the event group 503 comprises at least one still image 401C, which comprises the face image of the appearing person 602, and at least one still image 401C, which comprises the face image of the appearing person 605 (one still image 401C comprising both the appearing persons 602 and 605 may be comprised in the event group 503), and that some still images 401C in the event group 503 are imported by the photographer 606, and some other still images 401C are still imported by the photographer 607. Like the case of the event group 501, it is possibly assumed that each of the appearing persons 605, 607 and photographers 602, 606 is the appearing person and is the photographer. This content is stored in the database 109A as index information 402.

If it is assumed that the viewer recognition module 313 has recognized the present viewers 601 and 602, the group extraction module 314 preferentially extracts the event group 501, which is associated with both the viewers 601 and 602, from the event groups 501, 502 and 503 in the HDD 109. In the meantime, the group extraction module 314 may extract, from the HDD 109, the event groups 502 and 503 which are associated with either the viewer 601 or the viewer 602.

Figure 6:
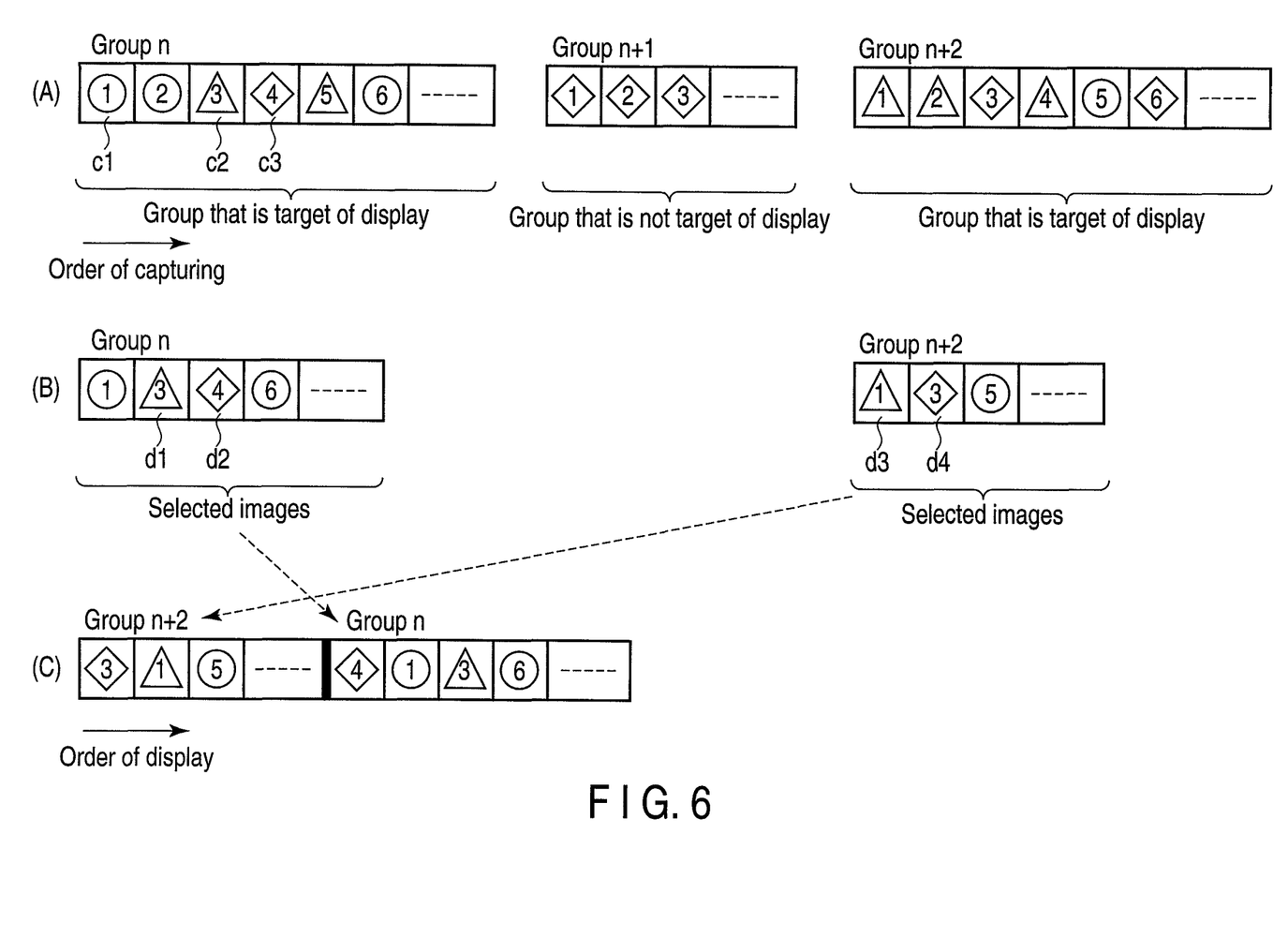
FIG. 6 is an exemplary conceptual view for explaining an example of the operation of image selection and image display, which is executed by the content reproduction application program of FIG. 3.

The image selection module 315, for example, selects still images, which meet a predetermined condition, from the still images in the extracted group. Needless to say, the image selection module 315 may select all still images in the extracted group. In addition, the image display module 316 displays the still images, which are selected by the image selection module 315, on the screen in a predetermined order. Referring to FIG. 6, a description is given of the extraction of groups by the group extraction module 314, the selection of still images by the image selection module 315, and the display of images by the image display module 316.

In FIG. 6, part (A) is a first conceptual view illustrating the state in which still images 401 stored in the HDD 109 are arranged on a time-series axis in the order of date/time of capturing, based on the index information 402 stored in the database 109A, and the still images 401 are classified into groups. As shown in part (A) of FIG. 6, it is assumed that the still images 401 stored in the HDD 109 are classified into three groups, namely, a group n, a group n+1 and a group n+2. Each of the boxes with numerals, such as 1, 2, 3, . . . , in each of the groups is representative of one still image 401, and these numerals are indicative of the order of dates/times of capturing in each group.

A circle in the box of the still image 401, which is indicated by symbol c1, indicates that the still image 401 comprises the face image of the viewer. A triangle in the box of the still image 401, which is indicated by symbol c2, indicates that the still image 401 is captured (imported) by the viewer. A diamond in the box of the still image 401, which is indicated by symbol c3, indicates that the still image 401 is neither an image comprising the face image of the viewer nor an image captured (imported) by the viewer.

In short, part (A) of FIG. 6 indicates that, of the three groups, i.e. group n, group n+1 and group n+2, those groups which comprise either the still image 401 comprising the face image of the viewer or the still image 401 captured by the viewer are two groups, i.e. group n and group n+2. Thus, the group extraction module 314 extracts from the HDD 109 the group n and group n+2 as groups comprising still images that are targets of display. In the present embodiment, still images 401, which belong to the same group as the still image 401 comprising the face image of the viewer or the still image 401 captured by the viewer, are determined to be images having a relation to the viewer.

Based on the index information 402 stored in the database 109A, the image selection module 315 selects, from the still images 401A belonging to the extracted groups, still images 401, for example, the upper limit number of which is set at a predetermined number. At this time, in principle, the image selection module 315 preferentially selects, for example, the still image 401 comprising the face image of the viewer and the still image 401 captured by the viewer, but the image selection module 315 also selects images in which no person appears, such as images of scenes.

In FIG. 6, part (B) is a second conceptual view showing a selection result of the still images 401 by the image selection module 315. As shown in part (B) of FIG. 6, in the group n, an image indicated by symbol d1, which has been imported by the viewer, is selected, and also an image indicated by symbol d2, which is neither an image comprising the face image of the viewer nor an image imported by the viewer, is selected. Similarly, in the group n+2, an image indicated by symbol d3, which has been imported by the viewer, is selected, and also an image indicated by symbol d4, which is neither an image comprising the face image of the viewer nor an image imported by the viewer, is selected.

The images indicated by symbols d1 to d4 are images which cannot be selected when a person is designated as search key information in conventional image search methods. In this respect, the content reproduction application program 202 executes an effective image search with a high-level intelligence, thereby to display a slide show so that "to where and with whom" can be understood.

In FIG. 6, part (C) is a third conceptual view showing the order of display of still images 401 by the image display module 316. As shown in part (C) of FIG. 6, the image display module 316 constructs the arrangement of groups in a time sequence from the present to the past (group n+2→group n), thereby to meet the desire to view latest images at first, and constructs the arrangement of images in each group such that the images can be enjoyed more naturally. In short, different algorithms may be adopted for the arrangement of groups and for the arrangement of images in each group.

If it is assumed that the still images 401 with the theme of "travel" have been selected, the image display module 316 places, for example, the image with no person, which is indicated by symbol d4 in the group n+2, that is, an image that is assumed to be a landscape image, at the first position, so that "to where" can first be understood. Following this image, other images are arranged in the order of date/time of capturing. Similarly, as regards the group n, the image indicated by symbol d2, which is assumed to be a landscape image, is placed at the first position, and other images are subsequently arranged in the order of date/time of capturing.

In other words, the content reproduction application program 202 executes effective image display with a high-level intelligence, for example, in such a manner as to place an image, which is suitable for grasping a scene such as "travel", as a representative image at the first position. If the theme, such as "travel", is not clearly set, the images in each group may be arranged in the order of date/time of capturing.

Figure 7:
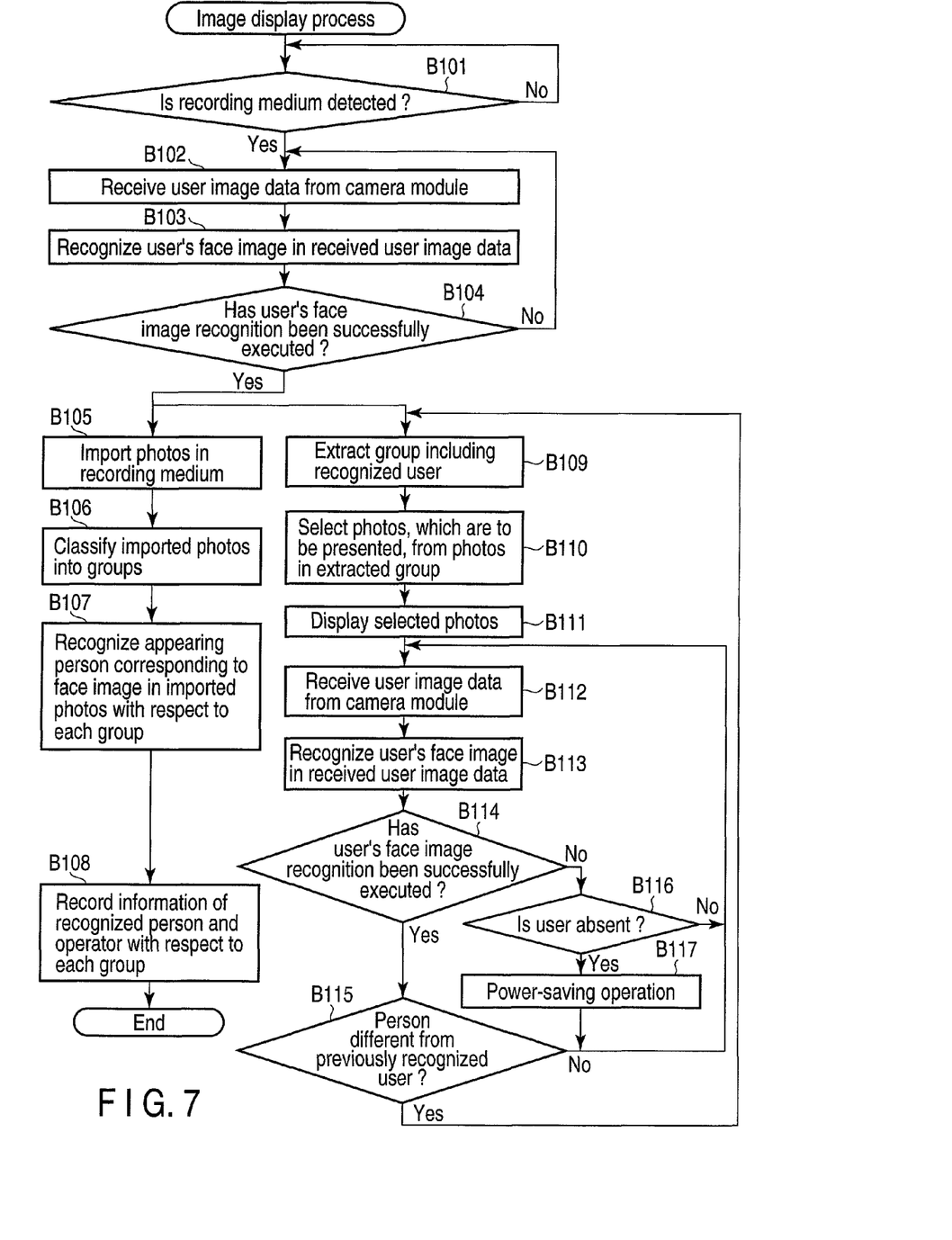
FIG. 7 is an exemplary flowchart illustrating the procedure of an image display process executed by the content reproduction application program of FIG. 3.

Next, referring to a flowchart of FIG. 7, a description is given of the procedure of the image display process executed by the content reproduction application program 202.

To start with, the case is assumed in which the content reproduction application 202 has been set in the import mode by the user. In the import mode, the content reproduction application 202 determines whether the recording medium 20A has been detected or not (block B101). If the recording medium 20A has been detected (YES in block B101), the content reproduction application 202 receives the user image (user image data) 403 which is generated by the camera module 115 (block B102).

Subsequently, the content reproduction application 202 recognizes the face image of the user (operator), which is comprised in the received user image 403 (block B103). Specifically, the content reproduction application 202 detects the face region comprised in the received user image 403, and extracts the face region. The content reproduction application 202 analyzes the extracted face region (face image) and recognizes the corresponding person. Then, the content reproduction application 202 determines whether the recognition of the user's face image has successfully been executed (block B104).

If the recognition of the user's face image has successfully been executed (YES in block B104), the content reproduction application 202 imports the still images 401 that are stored in the recording medium 20A (block B105). Responding to the completion of the import, the content reproduction application 202 classifies and groups the imported still images 401 (block B106). Then, the content reproduction application 202 recognizes the person (appearing person) corresponding to the face image in the imported images (block B107). Subsequently, the content reproduction application 202 stores in the database 109A, as the index information 402, the information relating to the user (operator) recognized in block B103 (photographer information 402B), and the information relating to the appearing person recognized in block B107 (image information 402A) (block B108).

When the import has been completed, the content reproduction application 202 may automatically transition to the presentation mode. The content reproduction application 202 extracts the groups which are associated with the user (viewer) who is recognized in block B103 or in block B113 (to be described later) (block B109). The content reproduction application 202 selects still images, which meet a predetermined condition, from the still images in the extracted groups (block B110). The content reproduction application 202 successively displays the selected still images on the screen in a predetermined order (block B111).

In parallel with the display of the still images in block B111, the content reproduction application 202 receives the user image 403 from the camera module 115 (block B112). The content reproduction application 202 recognizes the face image of the user (viewer) in the received user image 403 (block B113). Then, the content reproduction application 202 determines whether the recognition of the user's face image has successfully been executed (block B114).

If the recognition of the user's face image has successfully been executed (YES in block B114), the content reproduction application 202 determines whether the user, who has been recognized in block B113, is different from the previously recognized user (block B115). If the user recognized in block B113 is different from the previously recognized user (YES in block B115), the content reproduction application 202 returns to block B109. Specifically, the content reproduction application 202 displays on the screen proper still images for the newly recognized user by the process beginning with block B109.

If the user recognized in block B113 is identical to the previously recognized user (NO in block B115), the content reproduction application 202 returns to block B112. Specifically, the content reproduction application 202 continues to display on the screen the still images which are currently being displayed.

If the recognition of the user's face image has failed (NO in block B114), the content reproduction application 202 determines whether a user, who views the photo displayed on the screen, is absent (block B116). For example, if a region which is assumed to comprise a face image is not detected from the user image 403 or if the face image recognition in block B113 has failed a predetermined number of times or more, the content reproduction application 202 determines that a user, who views the still image displayed on the screen, is absent. If it is determined that a user, who views the still image displayed on the screen, is absent (YES in block B116), the content reproduction application 202 transitions to a power-saving mode which enables the operation with low power consumption (block B117). The content reproduction application 202, which operates in the power-saving mode, powers off the LCD 17, for example.

If it is determined that a user, who views the still image displayed on the screen, is present (NO in block B116), the content reproduction application 202 returns to block B112 in order to recognize the user (viewer).

Even if the recognition of the face image of the user (viewer) has failed, the content reproduction application 202 may store, for a predetermined time period, the information of the viewer at the time when the previous recognition was successfully executed, and may display still images based on this information. Thereby, proper images can be displayed on the screen even if the face image of the viewer could not clearly be captured and the recognition failed, for example, in such a case that the viewer has moved the face or the viewer's face has been hidden by some object.

By the above-described process, the content reproduction application 202 stores in the database 109A, as the index information 402, the information of the user (operator) who imports the still images (still image data) 401, and the information of the person (appearing person) corresponding to the face image in the still image 401, and the content reproduction application 202 stores the still image 401 in the HDD 109. In addition, based on the index information 402, the content reproduction application 202 extracts, in accordance with the user (viewer) who views the still images displayed on the screen, the groups comprising the still images associated with this viewer from the HDD 109, and displays the still images comprised in the groups on the screen. Thus, the content reproduction application 202 can extract the still images relating to the viewer (e.g. a still image comprising the face image of the viewer, or a still image imported by the viewer) from the still images 401 in the HDD 109.

While executing on the background the process relating to the grouping of the still images 401 and the generation of the index information 402, the content reproduction application 202 can execute, in parallel, the process of displaying the still images corresponding to the viewer on the screen. Moreover, the above-described generation of the index information 402 and the display of the still images corresponding to the viewer can be realized without operations by the user. In short, it is possible to realize the photo frame function which can manage photos (still image data) of users and present photos corresponding to a viewer (or viewers), while maintaining the convenience for the user and the simplicity of the apparatus.

The content reproduction application 202 may be provided with a function of manually setting or correcting the information relating to the operator. In addition, the content reproduction application 202 may be provided with a function of manually designating the viewer (e.g. designating a who mode or an "anyone" mode).

The camera module 115, which generates the user image data 403 for recognizing the operator and viewer, is not limited to the camera module built in the computer 10, and it may be, for example, an external Web camera connected to the computer 10 via the USB connector 19.

As has been described above, according to the present embodiment, the still images relating to the user who is the viewer can be presented without executing a time-consuming user operation of, e.g. selecting favorite image files. The content reproduction application 202 can display, in accordance with the change of the viewer, not only photos in which the viewer appears, but also photos taken by the viewer. Furthermore, the content reproduction application 202 can display, in addition to the photos in which the viewer appears and the photos taken by the viewer, photos relating to these photos, that is, photos belonging to the same event group as these photos. Therefore, the viewer can view the photos relating to the viewer in units of an event group, which is a logical unit. Besides, since the content reproduction application 202 extracts photos relating to the viewer, it is possible to exclude photos, etc. which the viewer does not want a third person to view.

All the procedures of the image display process according to the present embodiment may be executed by software. Thus, the same advantageous effects as with the present embodiment can easily be obtained simply by installing a program, which executes the procedures of the image display process, into an ordinary computer through a computer-readable storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An electronic apparatus comprising:
a viewer image generating module configured to generate a viewer image by capturing an image of a viewer;
a viewer face detecting module configured to detect a face image of the viewer in the generated viewer image;
a group image extraction module configured to extract images from a plurality of images associated with a plurality of face images of operators who have imported the plurality of images, the extracted images being associated with a face image of an operator who has imported the extracted images; and
an image display control module configured to control displaying of the extracted images on a screen;
wherein the plurality of images belong to a plurality of groups of images and satisfy a first condition;
wherein the group image extraction module is further configured to select groups from the plurality of groups of images in which each of the face images of a plurality of viewers is associated as either the face image of an appearing person or of the operator, when the face images of the plurality of viewers are recognized from the viewer image by a viewer recognition module;
wherein the selected groups from the plurality of groups of images satisfy a second condition; and
wherein the image display control module is configured to display images included in the selected groups on the screen in a predetermined order.

2. The electronic apparatus of claim 1, further comprising:
an image import module configured to import images in response to an instruction by the operator;
an operator image generating module configured to generate an operator image by capturing an image of the operator;
an operator face detecting module configured to detect a face image of the operator in the generated operator image; and
an associating module configured to associate each of the imported images with the face image of the operator.

3. An image display method comprising:
generating a viewer image by capturing an image of a viewer;
detecting a face image in the generated viewer image;
extracting images from a plurality of images associated with a plurality of face images of operators who have imported the plurality of images, the extracted images being associated with a face image of an operator who has imported the extracted images, wherein the plurality of images belong to a plurality of groups of images and satisfy a first condition;
controlling displaying of the extracted images on a screen;
selecting groups from the plurality of groups of images in which each of the face images of a plurality of viewers is associated as either the face image of an appearing person or of the operator, when the face images of the plurality of viewers are recognized from the viewer image, wherein the selected groups from the plurality of groups of images satisfy a second condition; and displaying of images included in the selected groups on the screen in a predetermined order.

4. A non-transitory computer readable medium having a computer program stored thereon that is executable by a computer to control the computer to execute functions of:

generating a viewer image by capturing an image of a viewer;

detecting a face image of the viewer in the generated viewer image;

extracting images from a plurality of images associated with a plurality of face images of operators who have imported the plurality of images, the extracted images being associated with a face image of an operator who has imported the extracted images, wherein the plurality of images belong to a plurality of groups of images and satisfy a first condition;

controlling displaying of the extracted images on a screen;

selecting groups from the plurality of groups of images in which each of the face images of a plurality of viewers is associated as either the face image of an appearing person or of the operator, when the face images of the plurality of viewers are recognized from the viewer image, wherein the selected groups from the plurality of groups of images satisfy a second condition; and displaying of images included in the selected groups on the screen in a predetermined order.

* * * * *